United States Patent
Saito et al.

[15] 3,672,510
[45] June 27, 1972

[54] FUEL FILTER

[72] Inventors: Nobuo Saito, Saitama-ken; Kyoji Namiki, Urawa, both of Japan

[73] Assignee: Kabushiki Kaisha Tsuchiya Seisakusho, Toyko, Japan

[22] Filed: Aug. 24, 1970

[21] Appl. No.: 66,309

[30] Foreign Application Priority Data

May 19, 1970 Japan..................................45/42090

[52] U.S. Cl............................................................210/438
[51] Int. Cl.........................................................B01d 29/00
[58] Field of Search...............................210/307, 435–441, 210/452, 457

[56] References Cited

UNITED STATES PATENTS

| | | | |
|---|---|---|---|
| 3,465,883 | 9/1969 | Jumper | 210/307 |
| 3,237,770 | 3/1966 | Humbert, Jr. | 210/438 X |
| 73,105 | 1/1868 | Lighthall | 210/439 |
| 3,000,467 | 9/1961 | Bowers | 210/439 X |
| 3,502,218 | 3/1970 | Tuffnell et al. | 210/438 X |
| 1,724,690 | 8/1929 | Aldrich | 210/438 UX |
| 3,239,064 | 3/1966 | White | 210/438 X |

*Primary Examiner*—Reuben Friedman
*Assistant Examiner*—R. W. Burks
*Attorney*—Karl W. Flocks

[57] ABSTRACT

A fuel filter for engines of automobiles comprising a closed casing, a filter element in the casing, a fuel inlet pipe extending through the wall of the casing and opening in the casing for introducing the fuel to be filtered into the space around the element, and a fuel outlet pipe extending through the wall of the casing and opening within the filter element at a level lower than that of the opening of the fuel inlet, the said fuel outlet pipe being formed with a small by-pass opening in the upper portion of the wall of the fuel outlet pipe extending in the filter element, so that the water content of the fuel when accumulated and frozen in a cold season will not clog the fuel inlet of the filter, and that sufficient fuel supply for a cold start of the engine will be ensured through the said by-pass opening.

4 Claims, 4 Drawing Figures

PATENTED JUN 27 1972  3,672,510

INVENTORS
Nobuo Saito
Kyoji Namiki
BY Karl W. Flocks
ATTORNEY

FUEL FILTER

BACKGROUND OF THE INVENTION

This invention relates to a fuel filter for engines of automobiles.

A fuel filter of known type has a fuel inlet in the lower portion of the casing, with a consequence that the water content of the fuel flown in is collected on the bottom of the casing. Because the accumulated water if admitted into the engine can have an adverse effect, it must be removed from the filter casing at suitable intervals. In reality, however, it is not unusual that the dewatering is carelessly neglected. Then, if the engine is stopped with the filter casing containing too much water and allowed to stand in a cold season, the water may freeze and clog the fuel inlet of the filter and make the starting of the engine totally impossible.

An attempt at precluding this possibility has been to provide the fuel inlet in the upper portion of the casing. Still, the water, if allowed to collect until the water level exceeds the lower end closure plate of the filter element, will permeate into the filter element and eventually the water levels in and out of the element will become equal, thus making the removal of water difficult. Negligence of dewatering for a prolonged period of time will raise the water level to a point near the fuel inlet in the upper portion of the casing and, if the fuel filter in that state is left unused in a cold season, the water will freeze and the resulting ice will, in the long run, choke up the fuel inlet.

SUMMARY OF THE INVENTION

The present invention is directed to improvements over the known filters through elimination of the foregoing disadvantages inherent to the latter.

More specifically, the present invention has for its object to provide a fuel filter of the type which filters fuel through a filter element of a fibrous material such as paper which is accommodated in a casing, so designed that the water content of the fuel even if excessively gathered in the filter casing and inside the element and frozen therein in a cold season will not clog the fuel inlet and that the fuel passage will be secured at the start of the engine by a by-pass opening formed in the fuel outlet pipe.

The above object is realized by a construction such that a fuel outlet pipe is provided as is suspending in the element, with the lower end extending below the fuel inlet so that the water level will not ascend thereabove, thus avoiding the possibility of the inlet being choked up following the closure of the outlet pipe with frozen water, and a small by-pass opening is formed in a relatively upper portion of the outlet pipe to ensure at least a minimum of fuel supply through the by-pass opening of the said outlet to permit starting of the engine which is otherwise infeasible with an ordinary fuel filter.

DETAILED DESCRIPTION OF THE INVENTION

Figure 1:
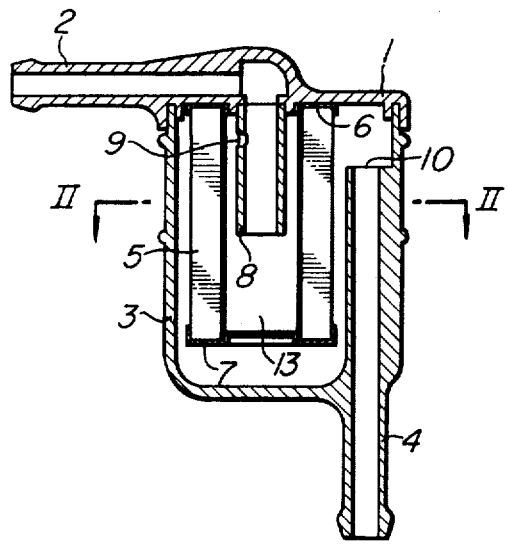
FIG. 1 is a vertically sectional view of an embodiment of the present invention.
Figure 2:
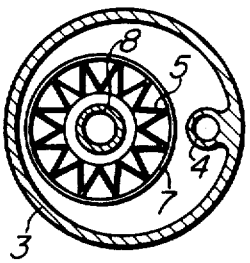
FIG. 2 is a horizontally sectional view of the embodiment.
Figure 3:
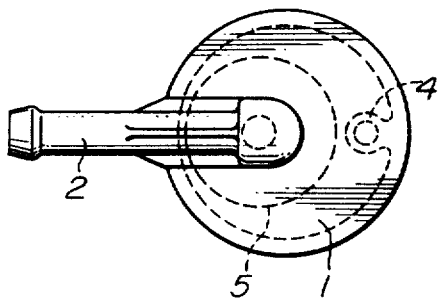
FIG. 3 is a plan view of the embodiment.
Figure 4:
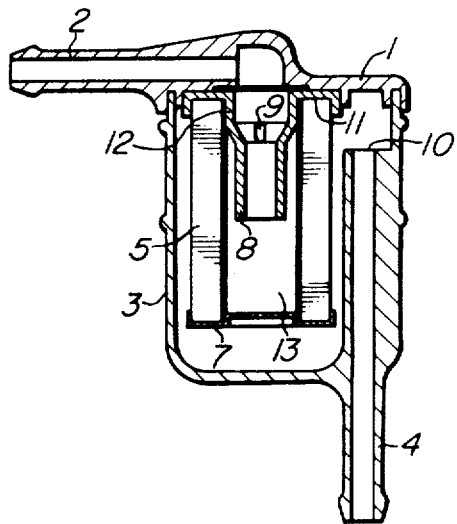
FIG. 4 is a vertically sectional view of another embodiment of the invention.

Referring to the accompanying drawing showing preferred embodiments of the present invention, a filter casing cover 1 is made of a synthetic resin material, e.g., nylon, and has a fuel feed pipe 2 in communication with a fuel outlet pipe 8 which is secured to the center of the casing cover 1 as if hanging down therefrom. A casing 3 is made of the same material as the cover has a fuel inlet pipe 4 integrally formed along a vertical wall of the casing. The opening 10 at the upper end of the inlet pipe 4 is open in the upper space inside the casing. A filter element 5 of an ordinary construction adapted to be placed in the casing is fabricated of a filter paper folded and pleated in the usual manner, and is liquid-tightly sealed at the upper and lower ends with end closure plates 6 and 7, respectively. The upper end closure plate 6 is bonded to the under-side of the cover 1 so as to surround the outlet pipe 8. The opening at the lower end of the outlet pipe 8 is open at a point below the upper end opening 10 of the inlet pipe 4, and a by-pass opening 9 is formed near the upper end of the outlet pipe 8. As seen in FIGS. 1 and 4, the by-pass opening 9 is small as compared with the end opening of the outlet pipe 8. It is obvious that the presence of the small by-pass opening 9 will not affect the sucking operation of the outlet pipe 8 through the lower end opening thereof. Fuel flows in through the inlet pipe 4 and, from the upper end opening 10 of the inlet pipe, enters the space defined between the element 5 and the casing 3, and is filtered as it passes through the element. The filtered fuel enters the opening at the bottom of the outlet pipe 8 and flows through the outlet pipe 8 and the feed pipe 2 toward the engine.

While the fuel is flowing, it leaves its water content behind in the casing as already stated. Water is thus slowly collected in and out of the element with gradual rises of the levels. If the removal of this water is neglected, the water collected underneath the element bottom 13 will increase until the water level reaches the opening at the lower end of the outlet pipe 8. This shuts off the flow of fuel and the fuel, therefore, tends to pass through only the by-pass opening 9 to flow into the feed pipe 2. However, because the cross sectional area of the by-pass opening 9 is by far the smaller than that of the upper end opening 10 of the inlet pipe 4, water and fuel virtually in the form of a mixture flow up and over the outlet pipe 8 from the lower end thereof. As a result, the mixture of fuel and water flows out into the engine from the lower end opening of the outlet pipe, the water being in an amount equal to the amount that is supplied from the inlet together with the fuel. For this reason, the water inside the element will not collect to a level above the opening at the lower end of the outlet pipe, and there is no danger of clogging of the upper end opening 10 of the inlet pipe which is located above the lower end opening of the outlet pipe.

However, if the water collected in the element is frozen by a low ambient temperature, the opening at the lower end of the outlet pipe is completely closed. Nevertheless, according to this invention, the opening of the inlet pipe 4 is never clogged by the water frozen and expanded in volume inside the casing 3, thanks to the opening of the inlet pipe 4 which is located below the opening at the lower end of the outlet pipe 8.

When the engine is started in this state, the fuel manages to flow through the by-pass opening 9 via a part of the filter element, and anyhow the engine is started. Some time after the start, the ice will melt to the usual form of water with the rise of the engine temperature.

Another embodiment of the invention illustrated in FIG. 4 will now be explained. It is equivalent to the first embodiment from which the upper end closure plate of the element (as at 6 in the embodiment shown in FIG. 1) is omitted. A member 12 formed in one piece with a countersunk body 11 having a rim on the upper end of the outlet pipe 8 is provided, and the upper end of the element is bonded to the outside of the outlet pipe, and is bonded altogether to the under-side of the cover 1.

As described above, even if the removal of water gathered in the casing is forgotten and the water frozen in a cold season chokes up the outlet pipe, the inlet pipe remains unchoked, even with the expansion of the water due to freezing, because the opening of the inlet pipe is above the lower end of the outlet pipe. Accordingly, fuel supply to the filter is possible at the time of starting, and the fuel so supplied is fed via the by-pass opening to the engine, thus ensuring uninterrupted running of the engine.

What is claimed is:

1. A fuel filter for engines of automobiles comprising a closed casing comprising a body portion of a synthetic resin material and a cover portion of a synthetic resin material bonded together to form a closed hollow casing, a filter element in the casing attached to the under-side of the cover portion of the casing at its one end face, a fuel inlet pipe extending through the wall of the casing vertically upwardly through the bottom wall of the body portion of the casing and opening in the casing at the upper portion of the casing for introducing the fuel to be filtered to the exterior of the element, and a fuel outlet pipe extending through the wall of the casing downwardly through the cover portion of the casing and opening within the filter element at a level lower than that of the opening of the fuel inlet pipe by a distance at least equal to the height difference between the levels of the water introduced in the casing as entrained on the inlet fuel stream and accumulated in the casing to the level of the fuel outlet pipe opening before and after the freezing of the water, characterized by a small by-pass opening formed through the upper portion of the wall of the fuel outlet pipe as extending in the filter element at a level higher than the opening of the fuel inlet pipe, the size of the by-pass opening being so small that the by-pass opening does not substantially affect the amount of flow of the fuel through the opening of the outlet pipe at the end thereof.

2. The fuel filter as claimed in claim 1, one portion of the fuel outlet pipe as extending in the filter element being formed of a length of a pipe of a synthetic resin material adhered to the inner wall surface of the cover portion of the casing at its one end, another portion of the fuel outlet pipe as extending outwardly of the cover portion of the casing being formed integrally with the cover portion of the casing and being in communication with the said one portion of the fuel outlet pipe.

3. A fuel filter as claimed in claim 2, the filter element comprising a cylindrical corrugated sheet of fiber material, such as paper, an end closure plate closing one end face of the cylindrical sheet and another end closure plate closing another end face of the cylindrical sheet except the inner portion of the end face through which the fuel output pipe extends.

4. A fuel filter as claimed in claim 3, said another end closure plate being formed integrally with the portion of the fuel outlet pipe as extending in the filter element.

* * * * *